(12) United States Patent
Moon et al.

(10) Patent No.: US 10,428,242 B2
(45) Date of Patent: Oct. 1, 2019

(54) SLURRY COMPOSITION FOR CHEMICAL MECHANICAL POLISHING

(71) Applicant: SAMSUNG ELECTRONICS CO., LTD., Suwon-si, Gyeonggi-do (KR)

(72) Inventors: Doo-sik Moon, Hwaseong-si (KR); Sang-hyun Park, Hwaseong-si (KR); Bo-un Yoon, Seoul (KR); Ho-young Kim, Seongnam-si (KR); Se-jung Park, Hwaseong-si (KR); Jae-hak Lee, Yongin-si (KR); Jin-myung Hwang, Changwon-si (KR)

(73) Assignees: SAMSUNG ELECTRONICS CO., LTD., Suwon-si, Gyeonggi-do (KR); K.C. TECH Co., Ltd., Anseong-si, Gyeonggi-do (KR)

( * ) Notice: Subject to any disclaimer, the term of this patent is extended or adjusted under 35 U.S.C. 154(b) by 0 days.

(21) Appl. No.: 15/897,261

(22) Filed: Feb. 15, 2018

(65) Prior Publication Data
US 2018/0282581 A1    Oct. 4, 2018

(30) Foreign Application Priority Data

Mar. 29, 2017    (KR) .......................... 10-2017-0039947

(51) Int. Cl.
*C09G 1/02*    (2006.01)
*C09K 3/14*    (2006.01)

(52) U.S. Cl.
CPC .............. *C09G 1/02* (2013.01); *C09K 3/1409* (2013.01); *C09K 3/1463* (2013.01)

(58) Field of Classification Search
USPC ........................................................ 252/79.1
See application file for complete search history.

(56) References Cited

U.S. PATENT DOCUMENTS

| | | | |
|---|---|---|---|
| 5,378,251 A | 1/1995 | Culler et al. | |
| 7,090,786 B2 * | 8/2006 | Hattori | ...................... C09G 1/02 216/103 |
| 7,601,273 B2 | 10/2009 | Roh et al. | |
| 8,338,300 B2 | 12/2012 | Lee et al. | |
| 8,551,887 B2 | 10/2013 | Shi | |
| 8,790,521 B2 | 7/2014 | McConnell et al. | |
| 9,487,675 B2 | 11/2016 | Raman et al. | |
| 2006/0141741 A1 | 6/2006 | Yi et al. | |
| 2013/0260558 A1 | 10/2013 | Oota et al. | |
| 2014/0017892 A1 * | 1/2014 | Ward | ................ H01L 21/31116 438/693 |
| 2016/0068711 A1 | 3/2016 | Choi et al. | |

FOREIGN PATENT DOCUMENTS

| | | |
|---|---|---|
| JP | 2010-028086 | 2/2010 |
| KR | 10-0600429 | 7/2006 |
| KR | 10-0662546 | 12/2006 |
| KR | 10-0725550 | 5/2007 |
| KR | 10-0786950 | 12/2007 |
| KR | 10-1091603 | 12/2011 |
| KR | 10-1389828 | 4/2014 |
| KR | 10-1534338 | 6/2015 |
| KR | 10-1656421 | 9/2016 |
| KR | 10-2016-0125189 A | 10/2016 |

* cited by examiner

*Primary Examiner* — Roberts P Culbert
(74) *Attorney, Agent, or Firm* — Lee & Morse, P.C.

(57) ABSTRACT

A slurry composition for chemical mechanical polishing, the slurry composition including ceramic polishing particles; a dispersion agent; a pH control agent and an additive having affinity with silicon nitride.

20 Claims, 10 Drawing Sheets

SLURRY COMPOSITION FOR CHEMICAL MECHANICAL POLISHING

CROSS-REFERENCE TO RELATED APPLICATION

Korean Patent Application No. 10-2017-0039947, filed on Mar. 29, 2017, in the Korean Intellectual Property Office, and entitled: "Slurry Composition for Chemical Mechanical Polishing," is incorporated by reference herein in its entirety.

BACKGROUND

1. Field

Embodiments relate to a slurry composition for chemical mechanical polishing.

2. Description of the Related Art

A process of removing a specific material film by using chemical mechanical polishing is widely used, and, of various materials for forming films on a surface of a semiconductor substrate, silicon nitride may be one of the most frequently used materials.

SUMMARY

The embodiments may be realized by providing a slurry composition for chemical mechanical polishing, the slurry composition including ceramic polishing particles; a dispersion agent; a pH control agent and an additive having affinity with silicon nitride.

The embodiments may be realized by providing a slurry composition for chemical mechanical polishing, the slurry composition including ceria polishing particles; a dispersion agent; and an additive having affinity with silicon nitride, wherein a pH of the slurry composition is 3 to 6, and the additive having affinity with silicon nitride is included in the slurry composition in an amount of 0.001 parts by weight to 0.5 parts by weight, based on 100 parts of the dispersion agent.

The embodiments may be realized by providing a slurry composition for chemical mechanical polishing, the slurry composition including ceramic polishing particles; a dispersion agent; a pH control agent and a silicon nitride-protecting additive.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
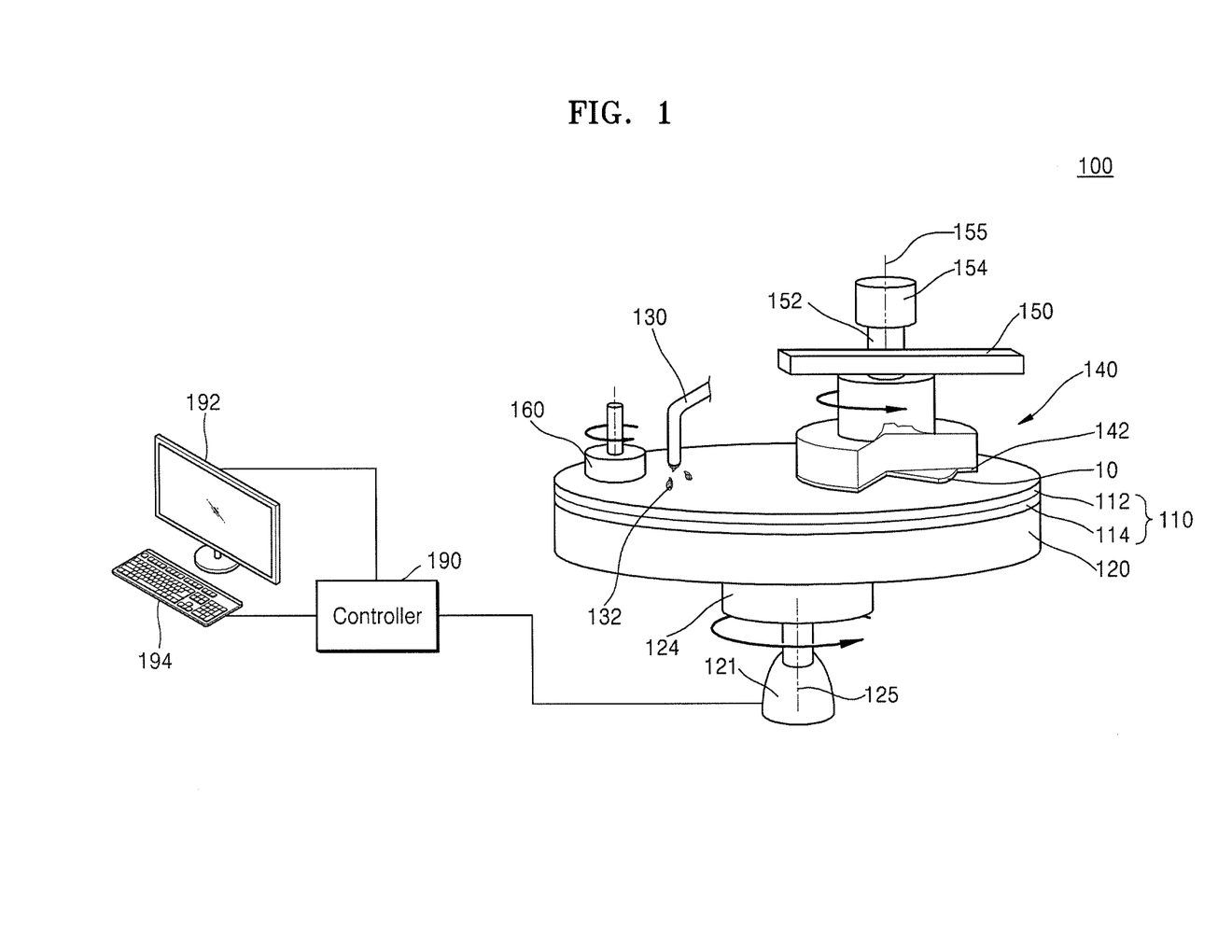
FIG. 1 illustrates a conceptual perspective view of a polishing device for performing chemical mechanical polishing, according to an embodiment.

FIG. 1 illustrates a conceptual perspective view of a polishing device 100 for performing chemical mechanical polishing, according to an embodiment.

Referring to FIG. 1, the polishing device 100 may include a platen 120 having a rotating disc shape. A polishing pad 110 may be placed on the platen 120. The platen 120 may be rotated with respect to an axis 125. For example, a motor 121 may rotate a driving axis 124 to rotate the platen 120 with respect to the axis 125. The polishing pad 110 may include an outer polishing layer 112 and a soft backing layer 114.

The polishing device 100 may include a slurry port 130 for dispensing a polishing agent 132 such as a slurry onto the polishing pad 110. The polishing device 100 may include a polishing pad conditioner 160 for abrading the polishing pad 110 to maintain the polishing pad 110 in a constant state.

The polishing device 100 may include at least one carrier head 140. The carrier head 140 may be operated through a substrate 10 being held against the polishing pad 110. The carrier head 140 may independently control polishing parameters, e.g., pressure related to the individual substrate 10.

For example, the carrier head 140 may include a retaining ring 142 to maintain the substrate 10 under a flexible membrane. Also, the carrier head 140 may include a plurality of pressurizable chambers that are defined by the flexible membrane and may be independently controlled. The pressurizable chambers may apply pressure to sections of the flexible membrane, and also, to sections of the substrate 10 corresponding to the sections of the flexible membrane, wherein the pressure may be independently controlled with respect to sections.

The carrier head 140 may hang from a support structure 150 (e.g., a carousel or a track) and is connected to a carrier head rotational motor 154 by a driving axis 152, and the carrier head 140 may rotate about a central axis 155. In an implementation, the carrier head 140 may oscillate in a lateral direction, e.g., on a slider on the carousel 150 or the track or oscillate due to rotary oscillation of the carousel 150. During an operation, the platen 120 may rotate about an axis 125 thereof, and the carrier head 140 may rotate the central axis 155 thereof and be translated across a top surface of the polishing pad 110 in a lateral direction.

Although only one carrier head 140 is illustrated in FIG. 1, in an implementation, at least two carrier heads for maintaining additional substrates may be provided to efficiently use a surface area of the polishing pad 110.

The polishing device 100 may include a control system for controlling the rotation of the platen 120. The control system may include a controller, such as a general programmable digital computer, an output device 192, such as a monitor for outputting data, and an input device 194, such as a keyboard for inputting data.

In FIG. 1, the control system is only connected to the motor 121. In an implementation, the system may be configured to control head pressure or speed of the head carrier 140 by being connected to the carrier head 140. In an implementation, the control system may control the supply of slurry by being connected to the slurry port 130.

An embodiment may provide a slurry composition for chemical mechanical polishing to be used in the polishing device 100.

The slurry composition for chemical mechanical polishing, according to the embodiment, may include, e.g., ceramic polishing particles; a dispersion agent; a pH control agent; and an additive having an affinity with or for silicon nitride.

In an implementation, the ceramic polishing particles may include, e.g., a metal oxide, a metal nitride, or a metal oxynitride. In an implementation, the metal may include, e.g., Si, Al, Ce, or Ti. In an implementation, the ceramic polishing particles may be, e.g., $CeO_2$ particles.

The ceramic polishing particles may have an average diameter in a range from, e.g., about 1 nm to about 150 nm. In an implementation, the ceramic polishing particles may have an average diameter in a range from, e.g., about 1 nm to about 100 nm. In an implementation, the ceramic polishing particles may have an average diameter in a range from, e.g., about 1 nm to about 80 nm. In an implementation, the ceramic polishing particles may have an average diameter in a range from, e.g., about 1 nm to about 60 nm. In an implementation, the ceramic polishing particles may have an average diameter in a range from, e.g., about 5 nm to about 100 nm. In an implementation, the ceramic polishing particles may have an average diameter in a range from, e.g., about 20 nm to about 80 nm.

The slurry composition for chemical mechanical polishing may further include the dispersion agent for dispersing the ceramic polishing particles.

In an implementation, the dispersion agent may be, e.g., substantially a liquid for uniformly dispersing the ceramic polishing particles. The dispersion agent may be, e.g., a water-based solvent or an organic solvent. For example, the dispersion agent may be a water-based solvent, such as water, deionized water, or ultrapure water. In an implementation, the dispersion agent may be an organic solvent, e.g., an aliphatic alcohol having a carbon number in a range from 1 to 15, or ether having a carbon number in a range from 2 to 20.

The ceramic polishing particles may be included in the slurry composition for chemical mechanical polishing in an amount of, e.g., about 0.1 parts to about 15 parts by weight, based on 100 parts by weight of the dispersion agent. In an implementation, the content of the ceramic polishing particles in the slurry composition for chemical mechanical polishing may be, e.g., about 0.5 parts to about 10 parts by weight based on 100 parts by weight of the dispersion agent. In an implementation, the content of the ceramic polishing particles in the slurry composition for chemical mechanical polishing may be, e.g., about 1 part to about 5 parts by weight based on 100 parts by weight of the dispersion agent.

pH Control Agent

The slurry composition for chemical mechanical polishing may further include the pH control agent for controlling pH of the composition. In an implementation, the slurry composition for chemical mechanical polishing may have a pH, e.g., in a range from about 3 to about 6 or in a range from about 4 to about 5.

An acid solution and an alkali solution may be appropriately used for controlling the pH of the slurry composition for chemical mechanical polishing to be in a range from about 3 to about 6 or about 4 to about 5. In an implementation, the pH control agent may include an acidic solution, e.g., sulfuric acid, phosphoric acid, hydrochloric acid, nitric acid, carboxylic acid, maleic acid, malonic acid, citric acid, oxalic acid, or tartaric acid, and/or an alkali solution, e.g., calcium hydroxide, potassium hydroxide, ammonium hydroxide, sodium hydroxide, magnesium hydroxide, triethyl amine, TMA Hydroxide, or ammonia. In an implementation, the pH control agent may be included in the slurry composition in a suitable amount such that the slurry composition has a pH in a range from about 3 to about 6.

Polishing Acceleration Agent

A polishing acceleration agent used in chemical mechanical polishing may include a low-molecular-weight anion, a high-molecular-weight anion, a hydroxyl acid, and an amino acid. For example, the low-molecular-weight anion may include at least one of citric acid, polyacrylic acid, polymethacrylic acid, and a co-polymeric acid or salt of these materials. The hydroxyl acid may include at least one of hydroxyl benzoic acid, ascorbic acid, or a salt of these materials. Examples of the amino acid may include picolinic acid, serine, proline, arginine, asparagine, aspartic acid, cysteine, glutamine, glutamic acid, glycine, histidine, lysine, phenylalanine, tyrosine, valine, tryptophan, betaine, pyroglutamic acid, amino butyric acid, pyridine carboxylic acid, polyethyleneglycol amino ether acetic acid, and isoleucine.

Additional examples of the polishing acceleration agent may include a quinone based compound, such as a 3-hydroxy-4-methyl-phenol anion, or a 3-hydroxy-4-hydroxymethyl-phenol anion, 4-methyl-benzene-1,3-diol, kojic acid, maltol propionate, and maltol isobutyrate. Examples of the quinine compound may include a dienone, a diol, and a dienol (dienol anion) including an alkylbenzene diol group and hydroxyl and alkyl groups; a dienone, a diol, and a dienol anion including hydroxyl and alkyl groups; a dienone, a diol, and a dienol anion in which a phenol anion and an alkyl group are connected by an oxo group; and a dienone, a diol, and a dienol anion including a hydroxyalkyl group and a benzene ring.

Examples of the quinine compound may include 4-alkyl-benzene-1,3-diol, 3-hydroxy-4-alkyl-cyclohexa-2,5-dienone, a 6-alkyl-3-oxo-cyclohexa-1,4-dienol anion, 3-hydroxy-6-alkyl-cyclohexa-2,4-dienone, a 4-alkyl-3-oxo-cyclohexa-1,5-dienol anion, a 3-hydroxy-4-alkyl-phenol anion, a 5-hydroxy-2-alkyl-phenol anion, a 3-Hydroxy-4-alkyl-phenol anion, a 5-Hydroxy-2-hydroxyalkyl-phenol anion, a 3-Hydroxy-4-hydroxyalkyl-phenol anion, 3-hydroxy-4-hydroxyalkyl-cyclohexa-2,5-dienone, a 6-hydroxyalkyl-3-oxo-cyclohexa-1,4-dienol anion, 3-Hydroxy-6-hydroxyalkyl-cyclohexa-2,4-dienone, a 4-Hydroxyalkyl-3-oxo-cyclohexa-1,5-dienol anion, and 4-Hydroxyalkyl-benzene-1,3-diol.

Additional examples of the polishing acceleration agent may include ammonium hydrogen phosphate, ammonium dihydrogen phosphate, bis(2-ethylhexyl)phosphate, 2-aminoethyl dihydrogen phosphate, 4-chlorobenzenediazonium hexafluorophosphate, nitrobenzenediazonium hexafluorophosphate, ammonium hexafluorophosphate), bis (2,4-dichlorophenyl) chlorophosphate, bis(2-ethylhexyl) hydrogen phosphate, bis(2-ethylhexyl) phosphite, calcium fluorophosphate, diethyl chlorophosphate, diethyl chlorothiophosphate, potassium hexafluorophosphate, pyrophosphoric acid, tetrabutylammonium hexafluorophosphate, and tetraethylammonium hexafluorophosphate.

Oxidizing Agent

A slurry composition for chemical mechanical polishing used for polishing a metal material film may include an oxidizing agent. Examples of the oxidizing agent may include: organic peroxide materials, such as hydrogen peroxide ($H_2O_2$), peracetic acid, perbenzoic acid, or tert-butyl hydroperoxide; a permanganic acid compound, such as potassium permanganate; a dichromic acid compound, such as potassium dichromate; a halogen acid compound, such as potassium iodate; a nitric acid compound, such as nitric acid or iron nitrate; a perhalogen acid compound, such as perchloric acid; persulfate, such as sodium persulfate, potassium persulfate, or ammonium persulfate; percarbonate, such as sodium percarbonate or potassium percarbonate; carbamide peroxide; and heteropoly acid.

Dispersion Stabilizer

In an implementation, the slurry composition for chemical mechanical polishing may further include a dispersion stabilizer, e.g., for ensuring or facilitating dispersion stability of the ceramic polishing particles. The dispersion stabilizer may include a non-ionic polymer or a cationic organic compound. For example, the dispersion stabilizer may include ethylene oxide, ethylene glycol, glycol distearate, glycol monostearate, glycol ethers, alkyl amine-containing alcohols, sorbitol-containing compounds, vinyl pyrrolidone, celluloses, and ethoxylate-based compounds. For example, the dispersion stabilizer may include diethylene glycol hexadecyl ether, decaethylene glycol hexadecyl ether, diethylene glycol octadecyl ether, eicosaethylene glycol octadecyl ether, diethylene glycol oleyl ether, decaethylene glycol oleyl ether, decaethylene glycol octadecyl ether, nonylphenol polyethylene glycol ether, ethylenediamine tetrakis (ethoxylate-block-propoxylate) tetrol, ethylenediamine tetrakis(propoxylate-block-ethoxylate) tetrol, polyethylene-block-poly(ethylene glycol), polyoxyethylene isooctylphenyl ether, polyoxyethylene octylphenyl ether, polyoxyethylene tridecyl ether, polyoxyethylene sorbitan tetraoleate, polyoxyethylene sorbitol hexaoleate, polyethylene glycol sorbitan monolaurate, polyoxyethylenesorbitan monolaurate, sorbitan monopalmitate, FS-300 nonionic fluorosurfactant, FSN nonionic fluorosurfactant, FSO nonionic ethoxylated fluoro surfactant, vinyl pyrrolidone, celluloses, 2,4,7,9-Tetramethyl-5-decyne-4,7-diol ethoxylate, 8-methyl-1-nonanol propoxylate-block-ethoxylate, allyl alcohol 1,2-butoxylate-block-ethoxylate, polyoxyethylene branched nonylcyclohexyl ether, or polyoxyethylene isooctylcyclohexyl ether. For example, the dispersion stabilizer may be mixed or included in the slurry composition for chemical mechanical polishing in a mixing ratio or amount in a range from about 0.1 wt. % to about 1 wt. %.

Surfactant

In an implementation, the slurry composition for chemical mechanical polishing may further include a surfactant. The surfactant may be a suitable surfactant, e.g., a non-ionic surfactant, a cationic group surfactant, an anionic group surfactant, or an ampholytic surfactant.

The non-ionic group surfactant may include, e.g., polyoxyethylene alkyl ethers, such as polyoxyethylene lauryl ether and polyoxyethylene stearyl ether; polyoxyethylene alkylphenyl ethers, such as polyoxyethylene octylphenyl ether and polyoxyethylene nonylphenyl ether; sorbitan higher fatty esters, such as sorbitan monolaurate, sorbitan monostearate, and sorbitan trioleate; polyoxyethylene sorbitan higher fatty esters, such as polyoxyethylene sorbitan monolaurate; polyoxyethylene higher fatty esters, such as polyoxyethylene monolaurate and polyoxyethylene monostearate; for example, glycerin higher fatty esters, such as oleic acid monoglyceride and stearic acid monoglyceride; polyoxyalkylenes, such as polyoxyethylene, polyoxypropylene, and polyoxybutylene; or block copolymers thereof.

The cationic surfactant may include, e.g., alkyltrimethylammonium chloride, dialkyldimethylammonium chloride, benzalkonium chloride, or alkyl-dimethyl-ammonium ethosulfate.

The anionic surfactant may include, e.g., carboxylates, such as sodium laurate, sodium oleate, N-acyl-N-methylglycine sodium salt, and sodium polyoxyethylene laurylether carboxylate; a sulfonate, such as sodium dodecylbenzenesulfonate, dialkyl-sulfosuccinate ester salt, and sodium dimethyl-5-sulfoisophthalate; sulfuric acid ester salts, such as sodium lauryl sulfate, sodium polyoxyethylene lauryl ether sulfate, and sodium polyoxyethylene nonylphenyl ether sulfate; phosphate ester salts, such as sodium polyoxyethylene lauryl phosphate, or sodium polyoxyethylene nonyl phenyl ether phosphate.

The ampholytic surfactant may include, e.g., a carboxybetaine-type surfactant, aminocarboxylate, imidazolinium betaine, lecithin, or alkylamine oxide.

The surfactant may be mixed or included in the slurry composition for chemical mechanical polishing with a mixing ratio or amount in a range from about 0.001 wt. % to about 0.5 wt. % of the slurry composition.

Polishing Inhibitor

In an implementation, the slurry composition for chemical mechanical polishing may further include a polishing inhibitor.

Examples of the polishing inhibitor may include a nitrogen containing compound, such as an amine and a heterocyclic compound containing low-molecular-weight nitrogen, such as benzotriazole, 1,2,3-triazole, and 1,2,4-triazole.

The polishing inhibitor may be mixed or included in the slurry composition for chemical mechanical polishing with a mixing ratio or in an amount in a range from about 0.1 wt. % to about 1 wt. % of the slurry composition.

Leveling Agent

In an implementation, the slurry composition for chemical mechanical polishing may further include a leveling agent for planarizing a surface to be polished.

Examples of the leveling agent may include ammonium chloride, ammonium lauryl sulfate, polyethylene glycol, polyoxyethylene alkyl ether, tri-ethanol amine sulfate, polyvinylpyrrolidone, and polyacrolein.

The leveling agent may be mixed or included in the slurry composition for chemical mechanical polishing with a mixing ratio or in an amount in a range from about 0.1 wt. % to about 1 wt. % of the slurry composition.

Additive Having Affinity with Silicon Nitride

The slurry composition for chemical mechanical polishing may further include the additive having affinity with silicon nitride. For example, the additive having affinity with silicon nitride may be a silicon nitride-protecting additive, as will be explained in greater detail below.

The additive having affinity with silicon nitride may be or include, e.g., an aldehyde group additive, a sulfonic acid group additive, or an alkyl halide group additive.

In an implementation, the aldehyde group additive may include, e.g., decyl aldehyde, dodecyl aldehyde, tetradecyl aldehyde, hexadecyl aldehyde, glutaraldehyde, or polyacrolein.

In an implementation, the sulfonic acid group additive may include, e.g., policresulen and/or a salt thereof, polystyrene sulfonate and/or a salt thereof, or polyvinyl sulfonate and/or a salt thereof.

In an implementation, the alkyl halide group additive may include, e.g., 1-chloroheptane, 1-chlorooctane, 1-chlorononane, 1-chlorodecane, 1-chlorododecane, 1-chlorotetradecane, 1-chlorohexadecane, polyvinyl chloride, 1-bromoheptane, 1-bromooctane, 1-bromononane, 1-bromodecane, 1-bromododecane, 1-bromotetradecane, 1-bromohexadecane, 1-iodoheptane, 1-iodooctane, 1-iodononane, 1-iododecane, 1-iodododecane, 1-iodotetradecane, or 1-iodohexadecane.

An amount of the additive having affinity with silicon nitride included in the composition may be, e.g., in a range from about 0.001 parts by weight to about 0.5 parts by weight, with respect to 100 parts by weight of the dispersion medium. In an implementation, the amount of the additive having affinity with silicon nitride may be, e.g., in a range from about 0.002 parts by weight to about 0.45 parts by weight with respect to 100 parts by weight of the dispersion medium. In an implementation, the amount of the additive having affinity with silicon nitride may be, e.g., in a range from about 0.005 parts by weight to about 0.40 parts by weight with respect to 100 parts by weight of the dispersion medium. In an implementation, the amount of the additive having affinity with silicon nitride may be, e.g., in a range from about 0.008 parts by weight to about 0.35 parts by weight with respect to 100 parts by weight of the dispersion medium. In an implementation, the amount of the additive having affinity with silicon nitride may be, e.g., in a range from about 0.01 parts by weight to about 0.3 parts by weight with respect to 100 parts by weight of the dispersion medium.

Maintaining the amount of the additive having affinity with silicon nitride at about 0.001 parts by weight or greater may help ensure that the effect of a selectivity increase between silicon oxide and silicon nitride is sufficient. Maintaining the amount of the additive having affinity with silicon nitride at about 0.5 parts by weight or less may help ensure that the effect of the selectivity increase between silicon oxide and silicon nitride is not saturated or degraded.

Figure 2A:
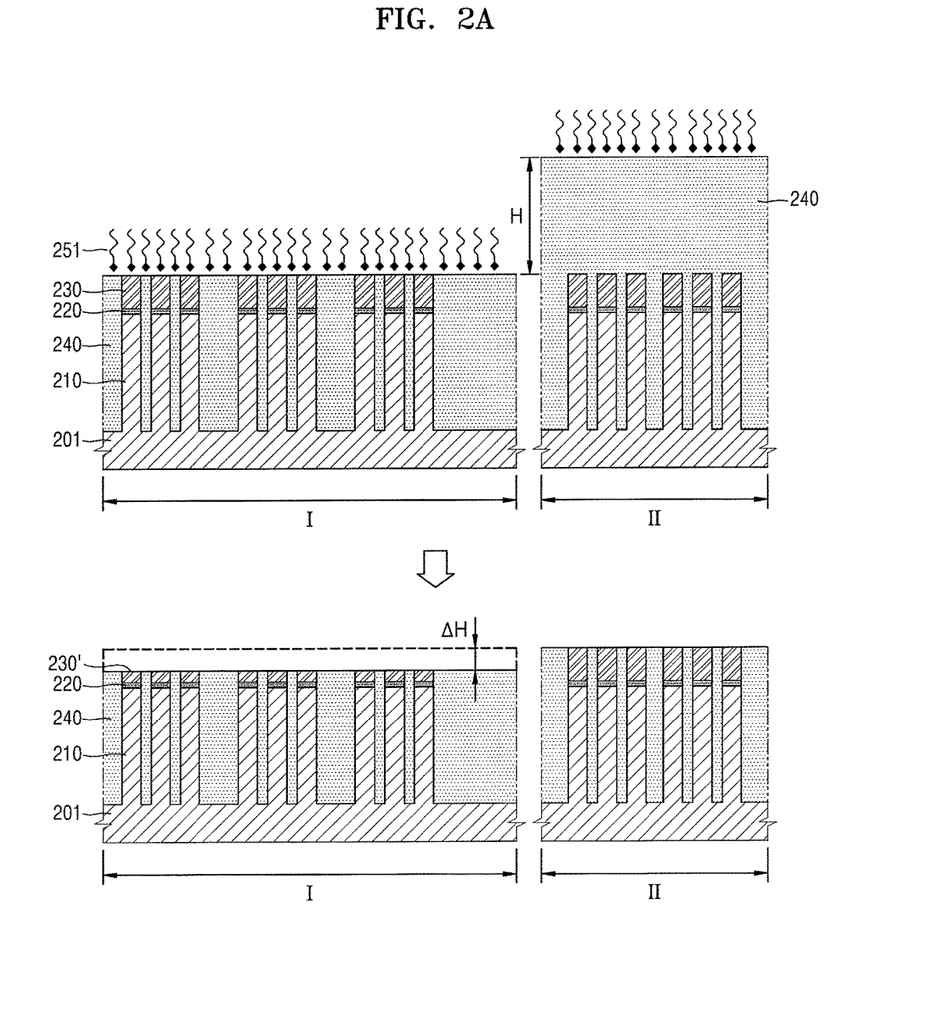
FIGS. 2A and 2B illustrate conceptual diagrams showing a principle of operating an additive having affinity with silicon nitride, according to an embodiment.
Figure 2B:
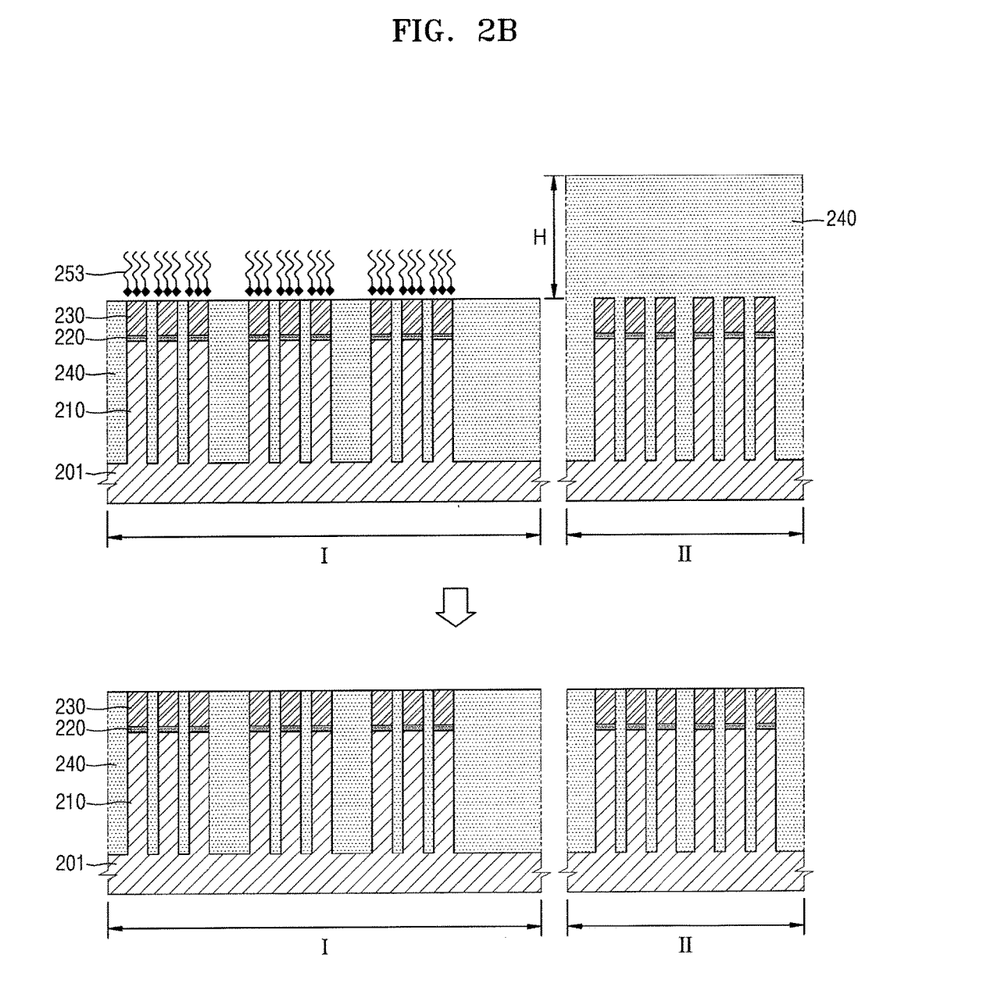

FIGS. 2A and 2B illustrate conceptual diagrams showing a principle of operating an additive having affinity with silicon nitride, according to an embodiment.

Referring to FIG. 2A, a plurality of active pins 210 may be formed in a first region I and a second region II of a substrate 201. An insulating layer 220 (formed of silicon oxide) and a capping layer 230 (formed of silicon nitride) may be stacked on an upper surface of the active pins 210. The insulating layer 220 and the capping layer 230 may be self aligned. The capping layer 230 may protect the active pins 210 thereunder. In an implementation, the capping layer 230 may be a structure that acts as a hard mask.

Side surfaces of the active pins 210, the insulating layer 220, and the capping layer 230 may be surrounded by a device isolation insulating film 240. For example, the device isolation insulating film 240 in the second region II may have a step difference of as much as H relative to the device isolation insulating film 240 in the first region I, and thus, may cover upper surfaces of the active pins 210, the insulating layer 220, and/or the capping layer 230.

In this state, when a leveling operation is performed on the first region I and the second region II, while the second region II is polished, a certain degree of polishing may also occur on the first region I. As a result, at a time when the polishing is terminated, e.g., the capping layer 230 in the second region II is exposed by the polishing, the capping layer 230 and the device isolation insulating film 240 in the first region I may have a certain degree of step difference ΔH relative to the leveled upper surface of the second region II.

In an implementation, as depicted in FIG. 2A, when the leveling work is performed by adding, to the polishing slurry, an additive 251 having insufficient selectivity with respect to the silicon oxide and the silicon nitride, the additive 251 may indistinguishably combine with a surface of the silicon oxide and a surface of the silicon nitride, and thus, an overall polishing speed may be reduced. Also, due to the same reason described above, a step difference ΔH may be generated.

Referring to FIG. 2B, an additive 253 according to an embodiment may have remarkably higher affinity with silicon nitride, and thus, the additive 253 may intensively combine with or concentrate at a surface of silicon nitride of the capping layer 230. The additive 253 may be a silicon nitride protecting additive, e.g., an additive that protects silicon nitride during etching or removal of layers.

In this situation, when the first region I and the second region II are leveled, the capping layer 230 of the first region I mostly may not be polished while the leveling with respect to the second region II is performed, and thus, the first region I may be maintained to be relatively intact. As a result, a step difference ΔH between the first region I and the second region II may not be generated, and overall leveling may be achieved at the time of completion of the polishing by exposing the capping layer 230 in the second region II.

In an implementation, of the additive 253 having affinity with the silicon nitride, according to the current embodiments, e.g., the aldehyde group additive may form a covalent bond with an amine group —NH$_2$ present on a surface of silicon nitride, as in Reaction Formula I.

—NH$_2$+R—CH=O→—N=CH—R+H$_2$O   <Reaction Formula I>

In an implementation, of the additive 253 having affinity with silicon nitride, according to the current embodiments, e.g., the alkyl halide group additive may form a bond with an amine group —NH$_2$ present on a surface of silicon nitride by an electrostatic interaction. For example, a bond between halogen atoms of the alkylhalide group additive and an amine group may be formed due to an electrostatic interaction therebetween.

In an implementation, of the additive 253 having affinity with silicon nitride, according to the current embodiments, the sulfonic acid group additive may form a bond with an amine group —NH$_2$ present on a surface of silicon nitride by electrostatic interaction. For example, a bond between a sulfonic group —SO$_3^-$ of the sulfonic acid group additive and an amine group may be formed due to an electrostatic interaction therebetween.

For example, the alkyl halide group additive and the sulfonic acid group additive may have characteristics whereby they repel a surface of hydroxy-terminated silicon oxide and are attracted to a surface of amine terminated silicon nitride in an acidic pH range, e.g., in a pH range from about 3 to about 6. Without being bound by theory, it is presumed to be a result of the negative charge of the halogen atom and the sulfonic group.

In an implementation, although the additives having affinity with silicon nitride, according to the current embodiments, may have a negative charge in a pH range from about 3 to about 6, the additives having affinity with silicon nitride may not form a bond with hydroxyl groups. For example, an additive having a carboxyl group may become negatively charged (R—COO$^-$) by breaking a hydrogen ion from R—COOH, but the additive may not repel a surface of silicon oxide since the additive may form a hydrogen bond with a hydroxyl group of the surface of the silicon oxide. Accordingly, an additive having a structure that may form a hydrogen bond with a hydroxyl group by being dissociated in a dispersion agent may not generate an effect expected by the additives according to an embodiment.

Method of Manufacturing a Slurry Composition for Chemical Mechanical Polishing

Hereinafter, a method of manufacturing a slurry composition for chemical mechanical polishing, according to an embodiment will be described.

Figure 3:
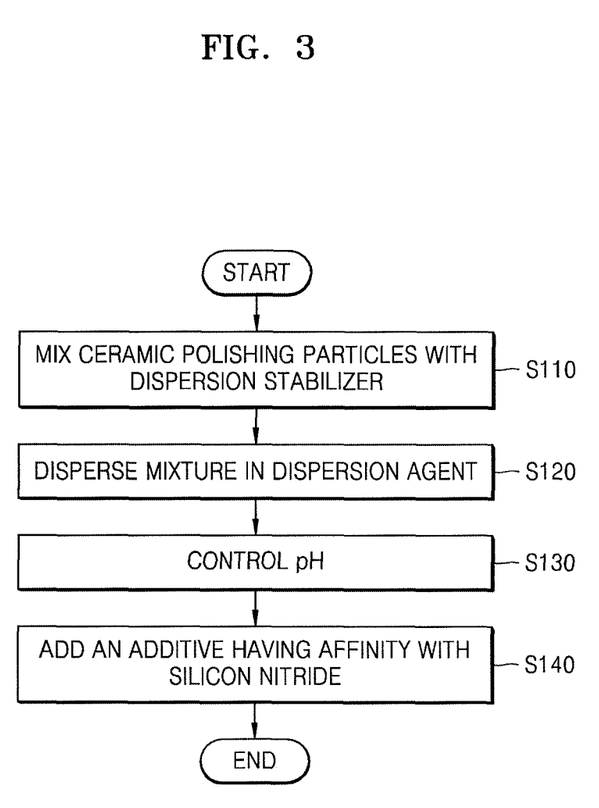
FIG. 3 illustrates a flowchart of a method of manufacturing a slurry composition for chemical mechanical polishing according to an embodiment.

FIG. 3 illustrates a flowchart of a method of manufacturing a slurry composition for chemical mechanical polishing, according to an embodiment.

Referring to FIG. 3, ceramic polishing particles are mixed with a dispersion stabilizer (S110). The types of the ceramic polishing particles and the dispersion stabilizer have been described above, and thus, a further description thereof will not be repeated.

Also, amounts of the ceramic polishing particles and the dispersion stabilizer may be determined based on an amount of a dispersion agent which will be described below. In an implementation, the amount of the ceramic polishing particles may be in a range from about 0.1 parts by weight to about 15 parts by weight based on 100 parts by weight of the dispersion agent. In an implementation, the amount of the dispersion stabilizer may be in a range from about 0.01 parts by weight to about 2 parts by weight based on 100 parts by weight of the dispersion agent.

A mixture of the ceramic polishing particles and the dispersion stabilizer manufactured in this manner may be dispersed in the dispersion agent (S120). An appropriate dispersion agent has been described above in detail, and thus, an additional description thereof will be omitted.

Next, a pH of a solution of the dispersion agent to which the mixture of the ceramic polishing particles and the dispersion stabilizer is added may be controlled (S130). In an implementation, the pH may be controlled within a range from about 3 to about 6, e.g., about 4 to about 5. A pH control agent may be added to the solution for controlling pH. The type of the pH control agent has been described above, and thus, an additional description thereof will be omitted.

An amount of the pH control agent may be enough to suitably control the pH in a range described above.

Next, an additive having affinity with silicon nitride may be added to the solution (S140). In an implementation, as illustrated in FIG. 3, the additive having affinity with silicon nitride may be added to the solution after controlling pH. In an implementation, the additive having affinity with silicon nitride may be added to the solution before controlling the pH.

The type and the amount of the additive having affinity with silicon nitride have been described above in detail, and thus, additional descriptions about the type and the amount will be omitted.

Method of Manufacturing a Structure by Using the Slurry Composition for Chemical Mechanical Polishing Hereinafter, a method of manufacturing a structure by using a slurry composition for chemical mechanical polishing, according to an embodiment, will be described.

Figure 4:
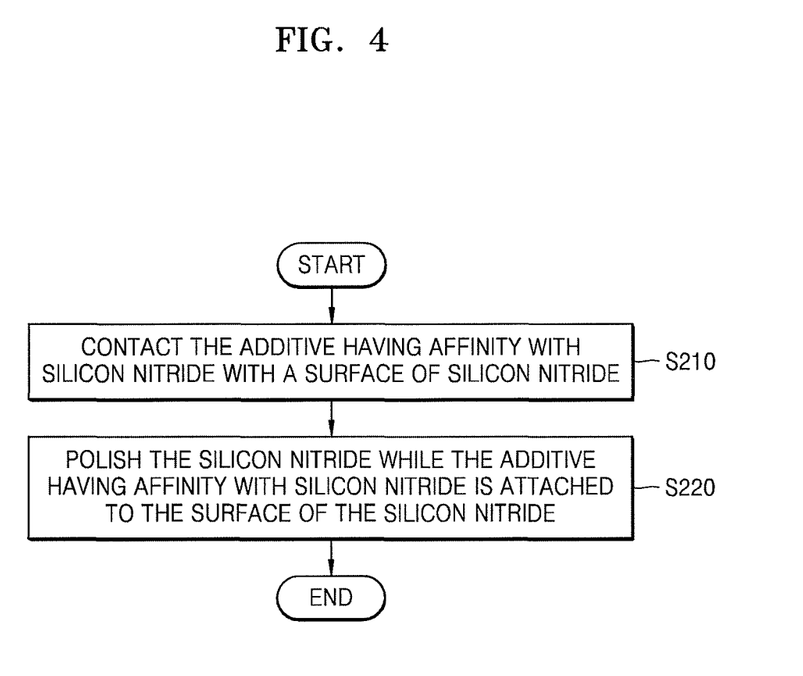
FIG. 4 illustrates a flowchart of a method of manufacturing a structure by using a slurry composition for chemical mechanical polishing, according to an embodiment.
Figure 5:
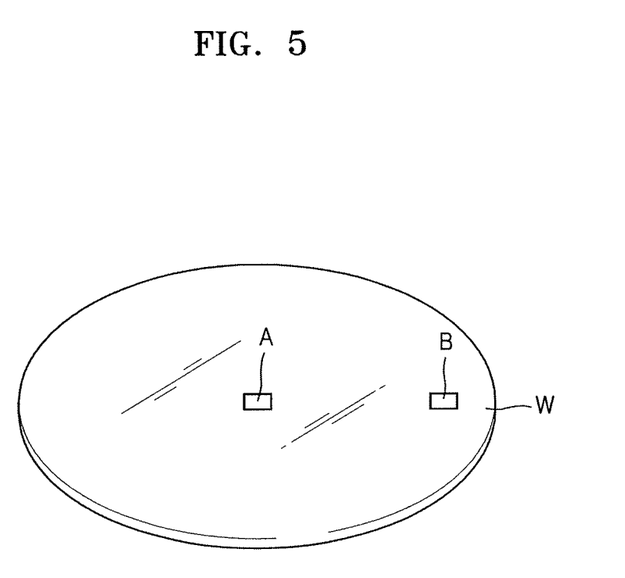
FIG. 5 illustrates a perspective view of a wafer for forming the structure of FIG. 4.

FIG. 4 illustrates a flowchart of a method of manufacturing a structure by using a slurry composition for chemical mechanical polishing, according to an embodiment. FIG. 5 illustrates a perspective view of a wafer for forming the structure of FIG. 4. FIGS. 6A through 6D illustrate schematic diagrams of cross-sectional views of portion A and portion B of FIG. 5, according to manufacturing steps.

Referring to FIG. 5, an aim is that polishing is uniformly performed with respect to all parts of a semiconductor substrate W. In an implementation, non-uniform polishing may be performed due to various reasons, such as a loading effect. In an implementation, in some cases, non-uniform polishing of different locations of the semiconductor substrate W may be desired. Here, a region A which is relatively closer to the center of the semiconductor substrate W and a region B which is relatively further away from the center of the semiconductor substrate W will be comparatively explained.

Figure 6A:
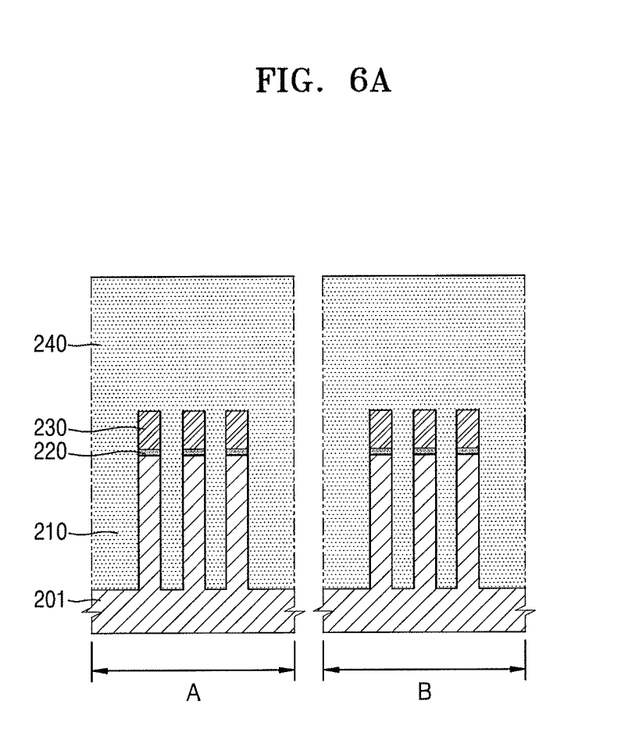
FIGS. 6A through 6D illustrate schematic diagrams of cross-sectional views of portion A and portion B of FIG. 5, according to manufacturing steps.

Referring to FIG. 6A, the active pins 210 may be uniformly formed on both the region A and the region B, and the insulating layer 220 and the capping layer 230 formed of silicon nitride may be disposed thereon. The active pins 210, the insulating layer 220, and the capping layer 230 have been described with reference to FIGS. 2A and 2B, and thus, additional descriptions thereof will be omitted.

In an implementation, the device isolation insulating film 240 including a silicon oxide may be provided on the region A and the region B to cover all the structures. In an implementation, an active region of a pin-type field effect transistor may a target structure. In an implementation, the method may be applied to another structure in which silicon nitride is used, e.g., a word line structure of a switching device, a bit line structure, a information storing structure of a memory device, and a connection region of a vertical NAND (VNAND) device.

Figure 6B:
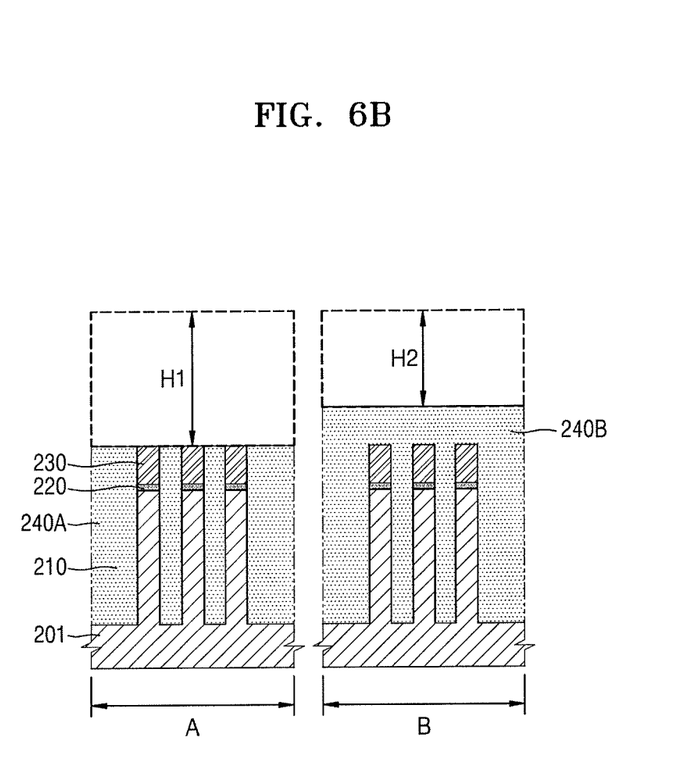

Referring to FIG. 6B, chemical mechanical polishing may be performed with respect to the region A and the region B. Uniform polishing with respect to both regions A and B may be intended. However, as shown in FIG. 6B, polishing in the region A may be performed relatively faster than in the region B. The non-uniform polishing could result due to various reasons, such as density of a pattern to be polished or non-uniformity applied pressure, etc., and due to the non-uniform polishing, silicon nitride is exposed in the region A, and, in the region B, a device isolation insulating film 240B having a thickness corresponding to a height difference (that is, H1–H2) between the two regions remains on the capping layer 230.

Figure 6C:
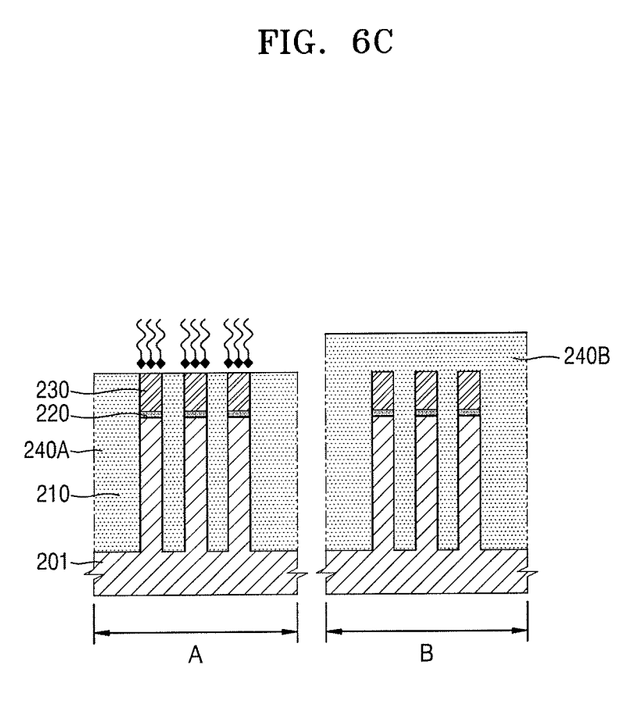

Referring to FIG. 4 and FIG. 6C, the additive having affinity with silicon nitride may be arranged to contact a surface of silicon nitride (S210). When the slurry for chemical mechanical polishing, according to the current embodiments, is used, the additive having affinity with silicon nitride may be included in the slurry for chemical mechanical polishing, the additive having affinity with silicon nitride may contact the surface of the silicon nitride exposed by the polishing, and thus, the additive and the silicon nitride may combine with each other.

Accordingly, the polishing of the exposed silicon nitride may be further restricted and the polishing of the silicon oxide may be continued.

Figure 6D:
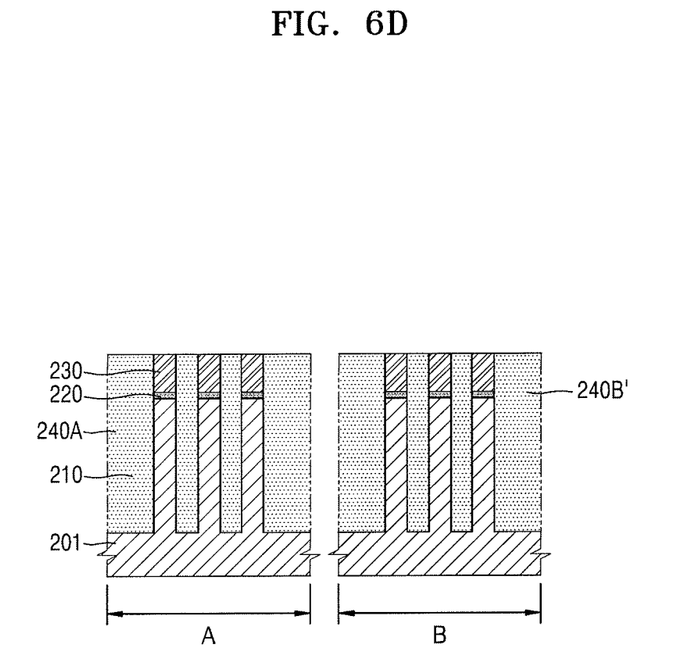

Referring to FIGS. 4 and 6D, the polishing of the silicon oxide may be continued, while the additive having affinity with silicon nitride is attached to the surface of the silicon nitride (S220). The polishing of the silicon oxide may be continued until the silicon nitride in the region B is exposed. As a result, the height of a device isolation insulating film 240A in the region A and the height of the device isolation insulating film 240a in the region B may be substantially equal, and thus, a leveled uniform surface of the semiconductor substrate W may be obtained.

When the slurry composition for chemical mechanical polishing, according to the current embodiments, is used, the polishing speed with respect to a silicon nitride material film may be controlled (e.g., reduced), and thus, the height distribution according to locations on a semiconductor substrate may be reduced. In an implementation, excessive loss of the silicon nitride material film in a region where the polishing speed is relatively faster may be prevented, and device characteristics may be uniformly distributed.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Comparative Example 1

Commercially available HS-8005, a product of Hitachi Chemical Co. was used.

Example 1

A slurry composition for chemical mechanical polishing was manufactured by adding policresulen, as an additive having affinity with silicon nitride, to commercially available HS-8005, a product of Hitachi Chemical Co., with a mixing ratio of 0.01 parts by weight with respect to 100 parts of the slurry.

Example 2

A slurry composition for chemical mechanical polishing was manufactured by using the same method as used in the Example 1, except for the use of glutaraldehyde as an additive having affinity with silicon nitride.

Comparative Example 2

Commercially available CES-350, a product of Asahi glass Co., was used.

Example 3

A slurry composition for chemical mechanical polishing was manufactured by adding 1-chloro octane, as an additive having affinity with silicon nitride, to commercially available CES-350, a product of Asahi Glass Co., with a mixing ratio of 0.05 parts by weight with respect to 100 parts of the slurry.

A polishing test was performed with respect to a substrate on which a pattern of silicon nitride and silicon oxide was formed by using the slurry composition. CETR CP-4 and an IC1010 polishing pad (a product of Dow chemical Co.) were used as equipment for the polishing test. A pressure applied to a wafer was 4 psi, and rotation speeds of the wafer and the polishing pad were 70 rpm and 69 rpm, respectively. Also, supply of a slurry for polishing was maintained at a flow rate of 100 ml/min.

Polishing was performed for two minutes by using each of the slurry compositions, and polishing rates were calculated by measuring thicknesses of silicon oxide and silicon nitride before and after polishing. The results are summarized in Table 1.

TABLE 1

| Additive | Addition rate (parts by weight) | Etching speed of silicon oxide (Å/min) | Etching speed of silicon nitride (Å/min) | Selectivity ratio |
|---|---|---|---|---|
| Example 1 policresulen | 0.01 | 1046 | 84 | 12.5 |
| Example 2 glutaraldehyde | 0.01 | 1049 | 80 | 13.1 |
| Comp. Example 1 | — | 1001 | 85 | 11.8 |
| Example 3 1-chloro octane | 0.05 | 1531 | 82 | 18.7 |
| Comp. Example 2 | — | 1536 | 101 | 15.2 |

As shown in Table 1, the selectivity ratio of the slurry of Example 1 was increased by about 5.9% when compared with the commercial polishing slurry of Comparative Example 1, and the selectivity ratio of the slurry of Example 2 was increased by about 11.0% when compared with the commercial polishing slurry of Comparative Example 1.

Also, the selectivity ratio of the slurry of Example 3 was increased by about 23.0% when compared with the commercial polishing slurry of Comparative Example 2.

By way of summation and review, polishing characteristics may vary according to positions on a surface of a semiconductor substrate, and a method according to an embodiment may help control a polishing speed with respect to each of material films.

The embodiments may provide a slurry composition for chemical mechanical polishing for reducing a polishing distribution according to positions on a semiconductor substrate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A slurry composition for chemical mechanical polishing, the slurry composition comprising:
    ceramic polishing particles;
    a dispersion agent;
    a pH control agent and
    an additive having affinity with silicon nitride, the additive having affinity with silicon nitride including a group that forms a covalent bond with an amine group of silicon nitride or an electrostatic interaction bond with an amine group of silicon nitride, the group not forming a hydrogen bond with a hydroxyl group in the dispersion agent.

2. The slurry composition for chemical mechanical polishing as claimed in claim 1, wherein:
    the additive having affinity with silicon nitride includes an aldehyde group additive, a sulfonic acid group additive, or an alkyl halide group additive,
    the aldehyde group additive forms the covalent bond between an aldehyde group thereof and the amine group of silicon nitride, the sulfonic acid group additive forms the electrostatic interaction bond between a sulfonic group thereof and the amine group of silicon nitride, and the alkyl halide group additive forms the electrostatic interaction bond between a halogen thereof and the amine group of silicon nitride.

3. The slurry composition for chemical mechanical polishing as claimed in claim 2, wherein the additive having affinity with silicon nitride includes decyl aldehyde, dodecyl aldehyde, tetradecyl aldehyde, hexadecyl aldehyde, glutaraldehyde, or polyacrolein.

4. The slurry composition for chemical mechanical polishing as claimed in claim 2, wherein the additive having affinity with silicon nitride includes policresulen and a salt thereof, polystyrene sulfonate and a salt thereof, or polyvinyl sulfonate and a salt thereof.

5. The slurry composition for chemical mechanical polishing as claimed in claim 2, wherein the additive having affinity with silicon nitride includes 1-chloroheptane, 1-chlorooctane, 1-chlorononane, 1-chlorodecane, 1-chlorododecane, 1-chlorotetradecane, 1-chlorohexadecane, polyvinyl chloride, 1-bromoheptane, 1-bromooctane, 1-bromononane, 1-bromodecane, 1-bromododecane, 1-bromotetradecane, 1-bromohexadecane, 1-iodoheptane, 1-iodooctane, 1-iodononane, 1-iododecane, 1-iodododecane, 1-iodotetradecane, or 1-iodohexadecane.

6. The slurry composition for chemical mechanical polishing as claimed in claim 2, wherein the ceramic polishing particles include ceria particles.

7. The slurry composition for chemical mechanical polishing as claimed in claim 6, wherein the ceria particles have an average diameter of 1 nm to 150 nm.

8. The slurry composition for chemical mechanical polishing as claimed in claim 6, wherein the ceramic polishing particles are included in the slurry composition in an amount of 0.1 parts by weight to 15 parts by weight, based on 100 parts of the dispersion agent.

9. The slurry composition for chemical mechanical polishing as claimed in claim 8, wherein the additive having affinity with silicon nitride is included in the slurry composition in an amount of 0.001 parts by weight to 0.5 parts by weight, based on 100 parts of the dispersion agent.

10. The slurry composition for chemical mechanical polishing as claimed in claim 1, wherein a pH of the slurry composition is 3 to 6.

11. A slurry composition for chemical mechanical polishing, the slurry composition comprising:
ceria polishing particles;
a dispersion agent; and
an additive having affinity with silicon nitride, the additive having affinity with silicon nitride including a group that forms a covalent bond with an amine group of silicon nitride or an electrostatic interaction bond with an amine group of silicon nitride, the group not forming a hydrogen bond with a hydroxyl group in the dispersion agent,
wherein:
a pH of the slurry composition is 3 to 6, and
the additive having affinity with silicon nitride is included in the slurry composition in an amount of 0.001 parts by weight to 0.5 parts by weight, based on 100 parts of the dispersion agent.

12. The slurry composition for chemical mechanical polishing as claimed in claim 11, wherein the additive having affinity with silicon nitride includes policresulen and a salt thereof, glutaraldehyde, 1-chloroheptane, 1-chlorooctane, 1-chlorononane, 1-chlorodecane, 1-chlorododecane, 1-chlorotetradecane, 1-chlorohexadecane, polyvinyl chloride, 1-bromoheptane, 1-bromooctane, 1-bromononane, 1-bromodecane, 1-bromododecane, 1-bromotetradecane, 1-bromohexadecane, 1-iodoheptane, 1-iodooctane, 1-iodononane, 1-iododecane, 1-iodododecane, 1-iodotetradecane, or 1-iodohexadecane.

13. The slurry composition for chemical mechanical polishing as claimed in claim 11, further comprising a dispersion stabilizer.

14. The slurry composition for chemical mechanical polishing as claimed in claim 11, wherein:
the additive having affinity with silicon nitride includes an alkyl halide group additive, and
a halogen atom of the alkyl halide group additive is negatively charged in an acidic environment.

15. The slurry composition for chemical mechanical polishing as claimed in claim 11, wherein the additive having affinity with silicon nitride does not form a hydrogen bond with a hydroxy group when the additive having affinity with silicon nitride is dissociated in the dispersion agent.

16. A slurry composition for chemical mechanical polishing, the slurry composition comprising:
ceramic polishing particles;
a dispersion agent;
a pH control agent and
a silicon nitride-protecting additive, the silicon nitride-protecting additive including a group that forms a covalent bond with an amine group of silicon nitride or an electrostatic interaction bond with an amine group of silicon nitride, the group not forming a hydrogen bond with a hydroxyl group in the dispersion agent.

17. The slurry composition for chemical mechanical polishing as claimed in claim 16, wherein:
the silicon nitride-protecting additive includes an aldehyde group additive, a sulfonic acid group additive, or an alkyl halide group additive,
the aldehyde group additive forms the covalent bond between an aldehyde group thereof and the amine group of silicon nitride,
the sulfonic acid group additive forms the electrostatic interaction bond between a sulfonic group thereof and the amine group of silicon nitride, and
the alkyl halide group additive forms the electrostatic interaction bond between a halogen thereof and the amine group of silicon nitride.

18. The slurry composition for chemical mechanical polishing as claimed in claim 16, wherein the silicon nitride-protecting additive includes decyl aldehyde, dodecyl aldehyde, tetradecyl aldehyde, hexadecyl aldehyde, glutaraldehyde, polyacrolein, policresulen and a salt thereof, polystyrene sulfonate and a salt thereof, polyvinyl sulfonate and a salt thereof, 1-chloroheptane, 1-chlorooctane, 1-chlorononane, 1-chlorodecane, 1-chlorododecane, 1-chlorotetradecane, 1-chlorohexadecane, polyvinyl chloride, 1-bromoheptane, 1-bromooctane, 1-bromononane, 1-bromodecane, 1-bromododecane, 1-bromotetradecane, 1-bromohexadecane, 1-iodoheptane, 1-iodooctane, 1-iodononane, 1-iododecane, 1-iodododecane, 1-iodotetradecane, or 1-iodohexadecane.

19. The slurry composition for chemical mechanical polishing as claimed in claim 16, wherein the silicon nitride-protecting additive is included in the slurry composition in an amount of 0.001 parts by weight to 0.5 parts by weight, based on 100 parts of the dispersion agent.

20. The slurry composition for chemical mechanical polishing as claimed in claim 16, wherein the slurry composition has a pH of 3 to 6.

\* \* \* \* \*